US012621345B2

(12) United States Patent
Goodsitt et al.

(10) Patent No.: US 12,621,345 B2
(45) Date of Patent: May 5, 2026

(54) DATA PROTECTION FOR MACHINE LEARNING MODELS TRAINED ON CLIENT DATA

(71) Applicant: Capital One Services, LLC, McLean, VA (US)

(72) Inventors: Jeremy Goodsitt, Champaign, IL (US); Michael Davis, Arlington, VA (US); Taylor Turner, Richmond, VA (US); Kenny Bean, Herndon, VA (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 64 days.

(21) Appl. No.: 18/828,830

(22) Filed: Sep. 9, 2024

(65) Prior Publication Data

US 2026/0075085 A1     Mar. 12, 2026

(51) Int. Cl.
*H04L 9/40* (2022.01)
*G06N 20/20* (2019.01)

(52) U.S. Cl.
CPC ......... *H04L 63/1466* (2013.01); *G06N 20/20* (2019.01)

(58) Field of Classification Search
CPC ........................... H04L 63/1466; G06N 20/20
See application file for complete search history.

(56) References Cited

U.S. PATENT DOCUMENTS 11,399,288 B2 * 7/2022 Jochem Sanz ...... H04L 63/1433
11,522,873 B2 * 12/2022 Chu ........................ G06F 18/22

| | | | |
|---|---|---|---|
| 11,621,085 B1 * | 4/2023 | Gottula | ................. G16H 50/50 |
| | | | 706/11 |
| 2019/0260780 A1 * | 8/2019 | Dunn | ...................... G06N 20/10 |
| 2022/0253691 A1 * | 8/2022 | Rokka Chhetri | .... G06N 3/0464 |
| 2023/0007042 A1 * | 1/2023 | Haworth | ................ H04L 63/205 |
| 2023/0088561 A1 * | 3/2023 | Ickin | ...................... G06N 3/098 |
| | | | 706/12 |
| 2023/0244987 A1 * | 8/2023 | Truong | .................. G06N 20/00 |
| | | | 706/11 |
| 2024/0054205 A1 * | 2/2024 | Goodsitt | ............... H04L 9/0891 |

FOREIGN PATENT DOCUMENTS

| | | | | | |
|---|---|---|---|---|---|
| CN | 113678064 A | * | 11/2021 | ............. | G06N 3/045 |
| CN | 118070845 A | * | 5/2024 | ......... | G06F 21/6245 |
| WO | WO-2021224453 A1 | * | 11/2021 | ............. | G06N 5/045 |
| WO | WO-2025080976 A1 | * | 4/2025 | ............. | G06N 20/20 |
| WO | WO-2025151120 A1 | * | 7/2025 | ......... | G06Q 20/4016 |

\* cited by examiner

*Primary Examiner* — Sarah Su
(74) *Attorney, Agent, or Firm* — Foley & Lardner LLP

(57)     ABSTRACT

Methods and systems are described herein for protecting client data while training machine learning models. The system may transmit, to client devices, simple models to be trained on a respective client device to generate predictions based on a respective subset of respective client data of the respective client device. The system may receive the trained simple models from the client devices. The system may input, into an ensemble model including the simple models, an unlabeled synthetic dataset. This may cause the ensemble model to aggregate a set of predictions generated by each simple model to generate labels for the unlabeled synthetic dataset. The system may then input, into a new model, the unlabeled synthetic dataset and the labels to train the new model to predict the labels for the unlabeled synthetic dataset.

20 Claims, 7 Drawing Sheets

<u>700</u>

100

300

| Entries | Feature A | Feature B | Feature C | Feature D |
|---------|-----------|-----------|-----------|-----------|
| <entry_1> | <value_1a> | <value_1b> | <value_1c> | <value_1d> |
| <entry_2> | <value_2a> | <value_2b> | <value_2c> | <value_2d> |
| <entry_3> | <value_3a> | <value_3b> | <value_3c> | <value_3d> |
| <entry_4> | <value_4a> | <value_4b> | <value_4c> | <value_4d> |
| <entry_5> | <value_5a> | <value_5b> | <value_5c> | <value_5d> |

| Entries | Feature A | Feature B | Feature C | Feature D |
|---------|-----------|-----------|-----------|-----------|
| 501 | 506 | 509 | 512 | 515 |
| <entry_1> | <value_1a> | <value_1b> | <value_1c> | <value_1d> |
| <entry_3> | <value_3a> | <value_3b> | <value_3c> | <value_3d> |

550

| Entries | Feature A | Feature B | Feature C | Feature D |
|---------|-----------|-----------|-----------|-----------|
| 503 | 506 | 509 | 512 | 515 |
| <entry_2> | <value_2a> | <value_2b> | <value_2c> | <value_2d> |
| <entry_4> | <value_4a> | <value_4b> | <value_4c> | <value_4d> |
| <entry_5> | <value_5a> | <value_5b> | <value_5c> | <value_5d> |

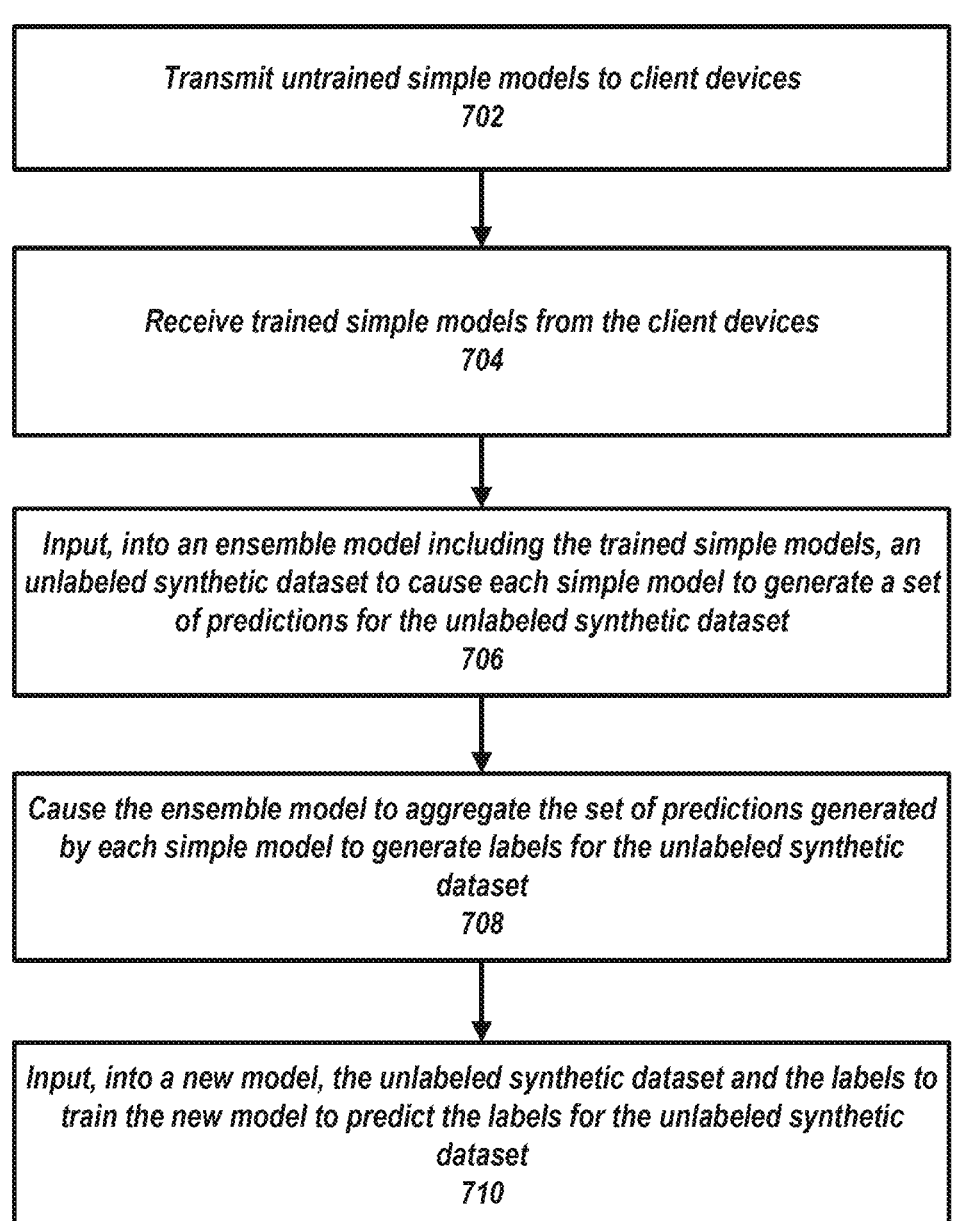

Transmit untrained simple models to client devices
702

Receive trained simple models from the client devices
704

Input, into an ensemble model including the trained simple models, an unlabeled synthetic dataset to cause each simple model to generate a set of predictions for the unlabeled synthetic dataset
706

Cause the ensemble model to aggregate the set of predictions generated by each simple model to generate labels for the unlabeled synthetic dataset
708

Input, into a new model, the unlabeled synthetic dataset and the labels to train the new model to predict the labels for the unlabeled synthetic dataset
710

FIG. 7

DATA PROTECTION FOR MACHINE LEARNING MODELS TRAINED ON CLIENT DATA

SUMMARY

Training machine learning models on client data may expose sensitive data to malicious actors. This risk is especially prevalent in federated learning systems, where models are trained on client data at client devices before being transmitted to a central server. Client data is again exposed when a model trained at the central server on aggregated client data is transmitted back to the client devices. Malicious actors may intercept a trained model while in transmission and ascertain client information from the trained model. In some circumstances, this may allow sensitive data—such as clients' medical or financial information—to be exploited. Thus, a mechanism is desired for protecting client data from malicious actors when transmitting machine learning models trained on client data.

Methods and systems are described herein for protecting client data from malicious actors while training machine learning models on client data. A data protection system may be built and configured to perform operations discussed herein. The data protection system may transmit multiple simple models to each client device from a central server. Each simple model may be generated so that once it is transmitted to a client device, it trains on a subset of the client data on that client device. For example, the data protection system may transmit several simple models to a particular client device and each simple model may train on a subset of features of the client data on that client device. By dividing the features across multiple simple models, the data protection system ensures that no single simple model learns a complete picture of the data for any client. The central server then receives the trained simple models from the client devices. Even if one or more of these trained simple models are intercepted during transmission to the central server, the client data is protected by each simple model's limited understanding of the client data.

At the central server, the data protection system may input an unlabeled synthetic dataset into an ensemble model. For example, the ensemble model may include the simple models trained at the client devices. The data protection system may cause each simple model to generate predictions for the unlabeled synthetic dataset based on that simple model's limited understanding of the client data on which it was trained. For example, based on the subset of features on which a particular simple model was trained, that simple model may predict a label for the synthetic dataset. The ensemble model may then aggregate the predictions generated by the various simple models to determine labels for the synthetic dataset. For example, the data protection system may label the synthetic dataset based on the predictions generated by the various simple models. The data protection system may then train a new model to predict the labels for the unlabeled synthetic dataset. The data protection system may transmit this new model to the client devices for deployment. The client data is again protected during transmission because the new model has been trained on synthetic data instead of client data. The data protection system thus enables training of machine learning models on client data while protecting the client data from exposure to malicious actors.

In particular, the data protection system may transmit, to each client device, a set of untrained simple models. Each untrained simple model may be generated to be trained on a client device using a subset of features of the client data on the client device. For example, the data protection system may transmit several simple models to a particular client device and each simple model may train on a subset of features of the client data on that client device. By dividing the features across multiple simple models, the data protection system ensures that no single simple model learns a complete picture of the data for any client.

In some embodiments, the data protection system may receive, from the client devices, the simple models once they have been trained on the client data. Each trained simple model may be trained to generate predictions based on a subset of the features of the client data. For example, each simple model may be trained to predict a label of the client data based on only a subset of the features. The client data is thereby protected by each simple model's limited understanding of the client data. Even if a trained simple model is intercepted during transmission to the central server, a malicious actor cannot ascertain the client data from the model.

The data protection system may then retrieve an unlabeled synthetic dataset. In some embodiments, the synthetic dataset may be generated based on the same features as the client data. The data protection system may input, into each simple model, a subset of the synthetic dataset. For example, the data protection system may input, into a first simple model trained on the first two features of client data, a subset of the synthetic dataset including the first two corresponding features. The data protection system may cause each trained simple model to generate a set of predictions for the synthetic dataset based on the subset of the features. For example, the first simple model may predict labels for the synthetic dataset based on the first two features of the synthetic dataset. The data protection system may aggregate the set of predictions generated by each trained simple model. For example, each simple model may predict labels for the synthetic dataset according to the respective subset of the features on which that simple model is trained. The data protection system may then aggregate the predictions from the trained simple models to generate labels for the synthetic dataset.

In some embodiments, the data protection system may input, into a new model, the synthetic dataset and the labels to train the new model to predict the labels for the synthetic dataset. The data protection system may then transmit copies of the new model to the client devices for deployment on the client device. For example, the data protection system may train a new model—which has not been exposed to client data—to predict the labels for the unlabeled synthetic dataset. The data protection system may transmit copies of this new model to the client devices for deployment. The client data is protected during transmission, as the new model has been trained on synthetic data instead of client data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates a data structure for client data, in accordance with one or more embodiments.

FIG. 5 illustrates subsets of the data structure for client data, in accordance with one or more embodiments.

FIG. 7 shows a flowchart of the process for protecting client data while training machine learning models, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
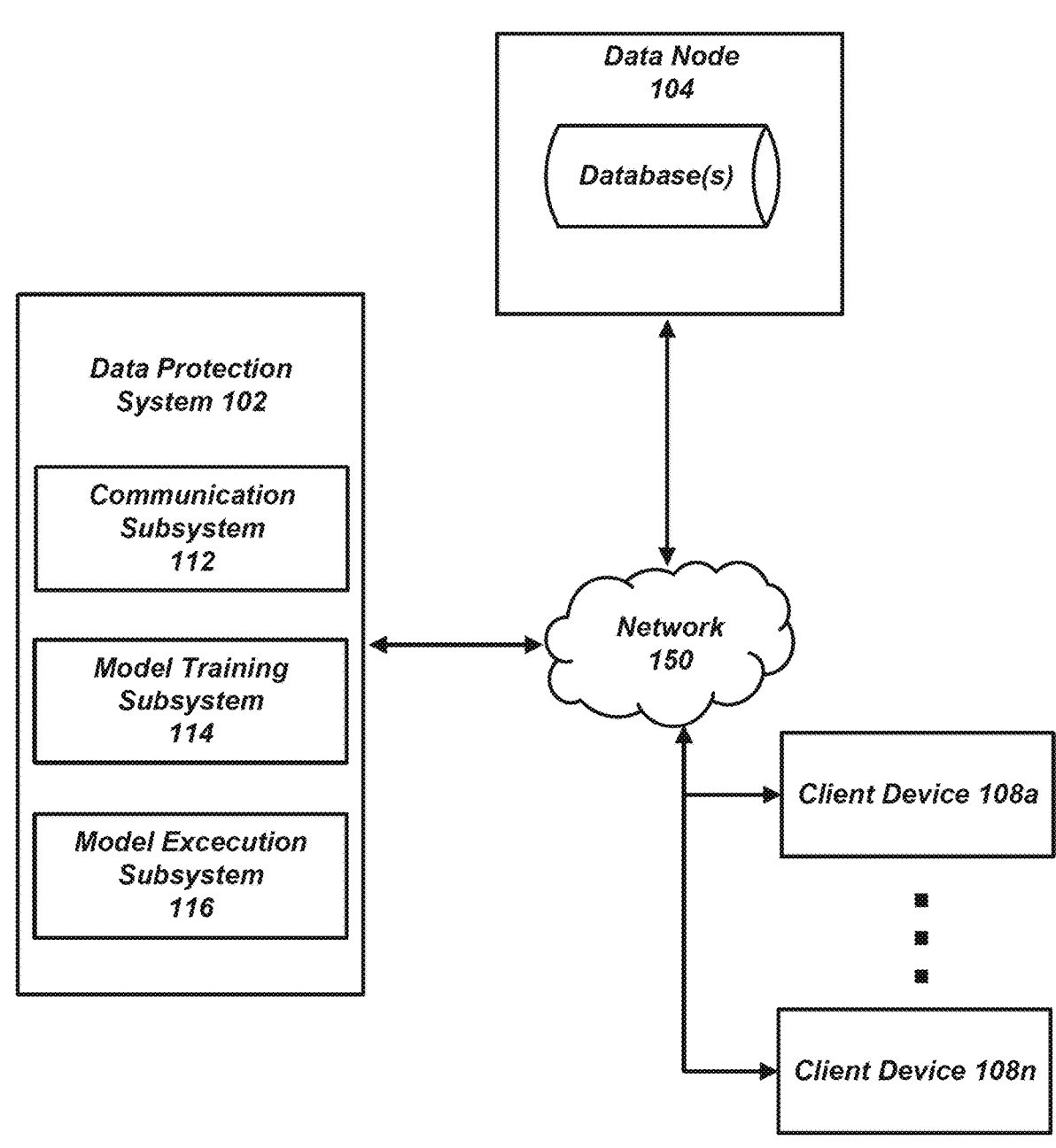
FIG. 1 shows an illustrative system for protecting client data while training machine learning models, in accordance with one or more embodiments.

FIG. 1 shows an illustrative system 100 for protecting client data while training machine learning models, in accordance with one or more embodiments. System 100 may include data protection system 102, data node 104, and client devices 108a-108n. Data protection system 102 may include communication subsystem 112, model training subsystem 114, model execution subsystem 116, and/or other subsystems. In some embodiments, only one user device may be used, while in other embodiments, multiple user devices may be used. The client devices 108a-108n may be associated with one or more users or one or more user accounts. In some embodiments, client devices 108a-108n may be computing devices that may receive and send data via network 150. Client devices 108a-108n may be end-user computing devices (e.g., desktop computers, laptops, electronic tablets, smartphones, and/or other computing devices used by end users). Client devices 108a-108n may (e.g., via a graphical user interface) run applications, output communications, receive inputs, or perform other actions.

Data protection system 102 may execute instructions for protecting client data from malicious actors while training machine learning models. Data protection system 102 may include software, hardware, or a combination of the two. For example, communication subsystem 112 may include a network card (e.g., a wireless network card and/or a wired network card) that is associated with software to drive the card. In some embodiments, data protection system 102 may be a physical server or a virtual server that is running on a physical computer system. In some embodiments, data protection system 102 may be configured on a user device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, data protection system 102 and data node 104 may reside on the same hardware and/or the same virtual server/computing device. Network 150 may be a local area network, a wide area network (e.g., the Internet), or a combination of the two.

Data protection system 102 (e.g., model training subsystem 114) may include or manage one or more machine learning models. Model training subsystem 114 may include software components, hardware components, or a combination of both. For example, model training subsystem 114 may include software components (e.g., API calls) that access one or more machine learning models. Model training subsystem 114 may access training data, for example, in memory. In some embodiments, model training subsystem 114 may access the training data on data node 104 or on client devices 108a-108n. In some embodiments, the training data may include entries with corresponding features and corresponding output labels for the entries. In some embodiments, model training subsystem 114 may access one or more machine learning models. For example, model training subsystem 114 may access the machine learning models on data node 104 or on client devices 108a-108n.

Model training subsystem 114 may include weak learners, strong learners, ensemble models, and other types of machine learning models. For example, a weak learner may generate predictions that are slightly more accurate than random guessing (e.g., as opposed to a strong learner, which is designed to be highly accurate). In the context of ensemble methods, weak learners may be combined to form a strong learner. If an ensemble model were deployed in a machine learning task, it would combine predictions from multiple individual weak models to improve overall accuracy and robustness. In some embodiments, the collective output could be more accurate than any single model's predictions. If an ensemble were to encounter diverse or noisy data, it may handle these better than a stand-alone model, as the aggregation of different models' predictions may mitigate individual errors. In some embodiments, model training subsystem 114 may train different types of models (e.g., weak learners, ensemble models, and strong learners) to work on conjunction and to protect client data.

Figure 2:
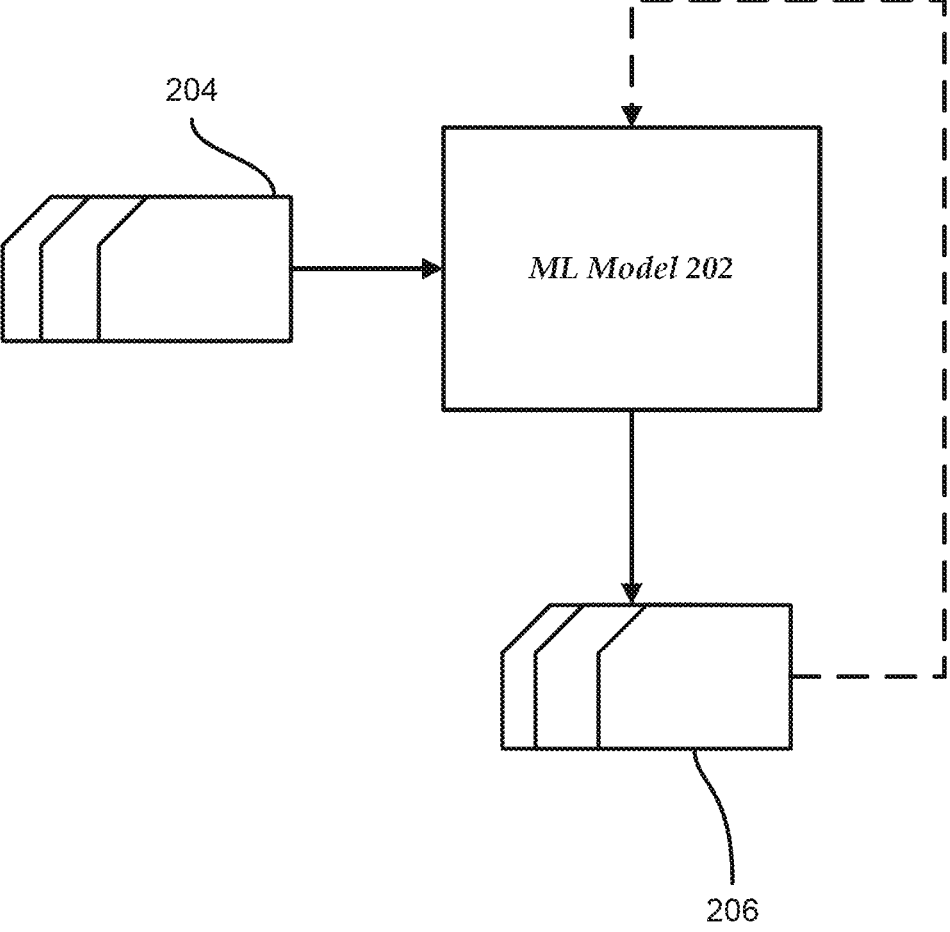
FIG. 2 illustrates an exemplary machine learning model, in accordance with one or more embodiments.

FIG. 2 illustrates an exemplary machine learning model 202, in accordance with one or more embodiments. In some embodiments, machine learning model 202 may be included in model training subsystem 114 or may be associated with model training subsystem 114. Machine learning model 202 may represent a weak learner, a strong learner, an ensemble model, or another type of machine learning model. Machine learning model 202 may take input 204 and may generate outputs 206. The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

Returning to FIG. 1, data protection system 102 (e.g., communication subsystem 112) may transmit, to each client device of client devices 108a-108n, a set of untrained simple models. For example, the untrained simple models may be untrained weak learners, as discussed in relation to FIG. 2. In some embodiments, multiple untrained weak learners may be sent to each client device. Each weak learners may be generated to be trained on a respective client device using a subset of respective client data on the respective client device. For example, the multiple weak learners transmitted to a particular client device may train on different subsets of the client data on that client device such that no single model trains on the entire set of client data for that client device.

FIG. 3 illustrates a data structure 300 for client data, in accordance with one or more embodiments. In some embodiments, data structure 300 may represent client data of a user of a particular client device (e.g., client device 108a). In some embodiments, the client data on a particular client device may be organized in a data structure such as data structure 300. For example, data structure 300 may include entries 303 and one or more features. The features may include feature 306, feature 309, feature 312, and feature 315. In some embodiments, entries 303 may represent labels or target features for the client data and the features may correspond to entries 303. In some embodiments, the client data may include usage data (e.g., a log of device activity), sensor data (e.g., from the device's global positioning system (GPS), gyroscope, or other sensors), performance data (e.g., battery or storage data), application data (e.g., financial logs, activity logs, health logs, communication logs, or notifications), or other types of client data. As an illustrative example, data structure 300 may include transactions by a particular user of a particular client device. Each entry of entries 303 may represent a transaction, such as a purchase. Feature 306 may represent a date of each transaction, feature 309 may represent a time of each transaction, feature 312 may represent an amount of each transaction, and feature 315 may represent a type of each transaction. The transaction data may represent sensitive financial data relating to the user of the client device.

In some embodiments, to protect client data, multiple weak learners may be trained on different subsets of the client data (e.g., data structure 300). It is imperative to ensure that each weak learner is trained on a subset of the client data from which a malicious actor would not be able to glean sensitive client data if the malicious actor were to intercept a trained weak learner during transmission. Thus, the client data (e.g., data structure 300) may be partitioned in a way that protects the client data. The client data may be partitioned in various ways, and the method of partitioning may depend on the relationships within the client data. For example, if the features of the client data depend on one another or if the features of the client data may be compared to one another to glean sensitive information about a user, model training subsystem 114 may partition the client data to separate related features. For example, model training subsystem 114 may separate features between different weak learners such that no single weak learner is trained on multiple features from which a malicious actor could glean sensitive information.

Thus, each untrained weak learner may be generated to be trained on a respective client device using a subset of features of respective client data on the respective client device. In particular, communication subsystem 112 may receive, from the client devices, feature data indicating features of aggregate client data of the client devices. Model training subsystem 114 may determine, based on the feature data, one or more relationships between the features. Model training subsystem 114 may then separate the features into a first subset of features and a second subset of features based on the one or more relationships between the features such that related features are separated between the first subset of features and the second subset of features. Model training subsystem 114 may then assign, for each client device, the first subset of features to a first weak learner and the second subset of features to a second weak learner. The first weak learner may be trained to generate a first set of predictions based on the first subset of features and the second weak learner may be trained to generate a second set of predictions based on the second subset of features.

Figure 4:
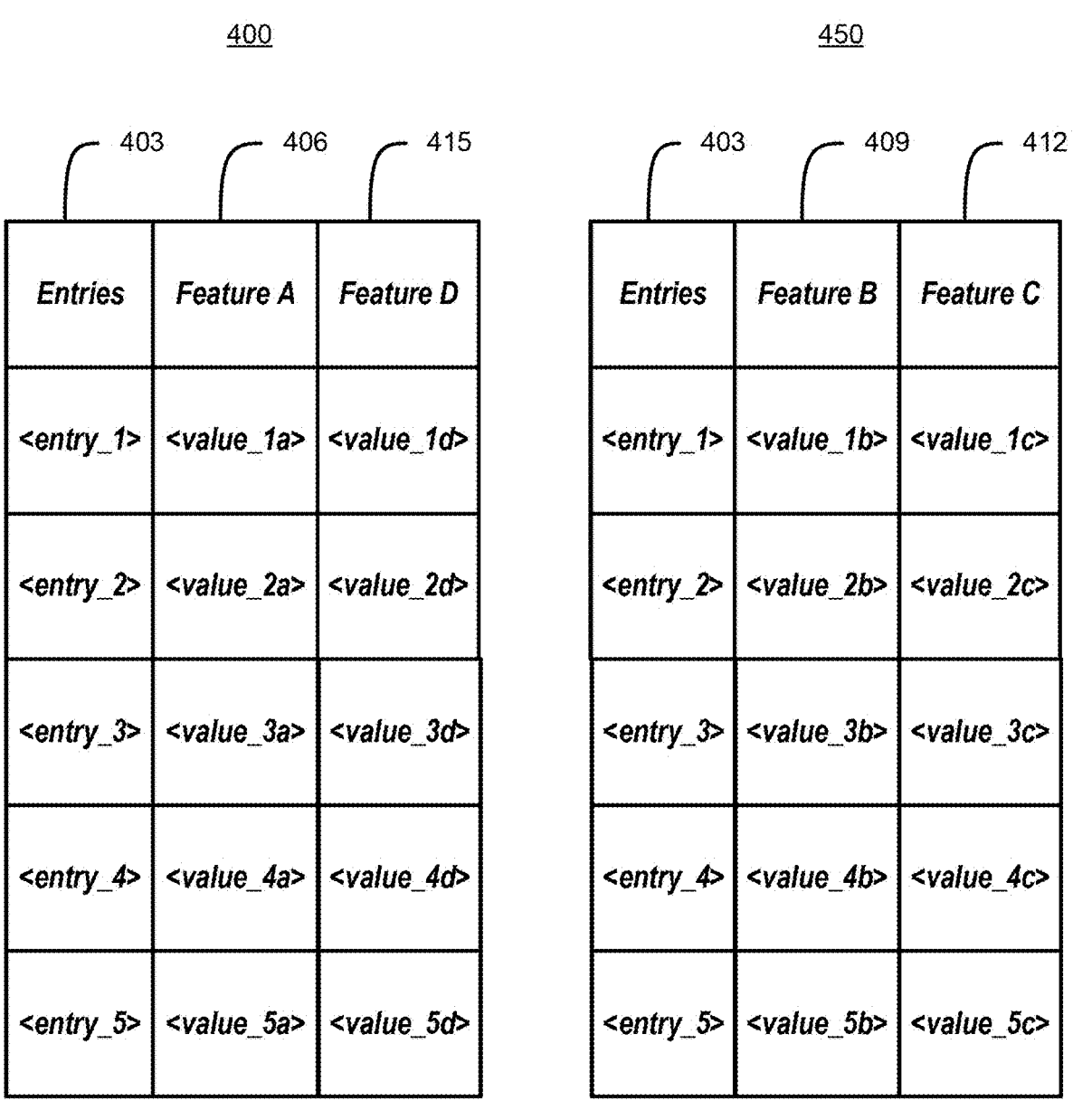
FIG. 4 illustrates subsets of the data structure for client data, in accordance with one or more embodiments.

FIG. 4 illustrates subset 400 and subset 450 of the data structure for client data, in accordance with one or more embodiments. In some embodiments, subset 400 and subset 450 may represent subsets of data structure 300, as shown in FIG. 3. Subset 400 may include entries 403, feature 406, and feature 415. Subset 450 may include entries 403, feature 409, and feature 412. In some embodiments, model training subsystem 114 may determine that one or both of feature 406 and feature 415 should be separated from one or both of feature 409 and feature 412. As an illustrative example, feature 406 may represent a date of a financial transaction, feature 409 may represent a time of each transaction, feature 412 may represent an amount of each transaction, and feature 415 may represent a type of each transaction. Model training subsystem 114 may determine that separate weak learners should be trained on feature 406 (e.g., dates) and feature 409 (e.g., times) so that a malicious actor could not intercept a single weak learner and determine the precise time and date at which a transaction occurred. In some embodiments, model training subsystem 114 may partition the features in other ways. For example, model training subsystem 114 may determine that feature 406, feature 409, feature 412, and feature 415 should all be separated. Model training subsystem 114 may thus cause four weak learners to train on the four features. In some embodiments, other methods of partitioning the features may be used.

In some embodiments, if the entries of the client data depend on one another or if the entries of the client data may be compared to one another to glean sensitive information about a user, model training subsystem 114 may partition the client data to separate related entries. For example, model training subsystem 114 may separate entries between different weak learners such that no single weak learner is trained on multiple entries from which a malicious actor could glean sensitive information. Thus, each untrained weak learner may be generated to be trained on a respective client device using a subset of features of respective client data on the respective client device. In some embodiments, communication subsystem 112 may receive, from the client devices, entry data indicating entries of aggregate client data from the client devices. Model training subsystem 114 may determine, based on the entry data, one or more relationships between the entries. Model training subsystem 114 may then separate the entries into a first subset of entries and a second subset of entries based on the relationships between the entries. Model training subsystem 114 may determine the subsets such that related entries are separated between the first subset of entries and the second subset of entries. Model training subsystem 114 may then assign, for each client device, the first subset of entries to a first weak learner and the second subset of entries to a second weak learner. The first weak learner may be trained to generate a first set of predictions based on the first subset of entries and the second weak learner may be trained to generate a second set of predictions based on the second subset of entries.

FIG. 5 illustrates subset 500 and subset 550 of the data structure for client data, in accordance with one or more embodiments. In some embodiments, subset 500 and subset 550 may represent subsets of data structure 300, as shown in FIG. 3. Subset 500 may include a first subset 501 of entries, feature 506, feature 509, feature 512, and feature 515. Subset 550 may include a second subset 503 of entries, feature 506, feature 509, feature 512, and feature 515. As an illustrative example, the data of subset 500 and subset 550 may include location data. Model training subsystem 114 may determine that certain entries should be separated to protect against malicious actors determining personal information such as home address or commonly traveled routes. Model training subsystem 114 may determine that one or both of a first entry and a third entry should be separated from one or more of a second entry, a fourth entry, and a fifth entry. Model training subsystem 114 may then assign a first weak learner to train on the first subset 500 and a second weak learner to train on the second subset 550.

In some embodiments, if multiple types of the client data depend on one another or if the types of the client data may be compared to one another to glean sensitive information about a user, model training subsystem 114 may partition the client data to separate related types of data. For example, model training subsystem 114 may separate types of client data between different weak learners such that no single weak learner is trained on multiple types of client data from which a malicious actor could glean sensitive information. In some embodiments, types of data may include continuous (e.g., can take any value within a given range), discrete (e.g., can only take certain specific values), categorical (e.g., cannot be quantified by numbers), or other types of data. In some embodiments, communication subsystem 112 may receive, from the client devices, indications of a first type of data (e.g., continuous) and a second type of data (e.g., categorical) of aggregate client data of the client devices. Model training subsystem 114 may separate a plurality of features of the client data into a first subset of features having the first type of data and a second subset of features having the second type of data. Model training subsystem 114 may then assign, for each client device, the first subset of features to a first weak learner and the second subset of features to a second weak learner. The first weak learner may be trained to generate a first set of predictions based on the first subset of features and the second weak learner may be trained to generate a second set of predictions based on the second subset of features.

In some embodiments, model training subsystem 114 may partition the features using a combination of techniques. For example, model training subsystem 114 may determine that the data should be partitioned according to feature and entry. Model training subsystem 114 may cause a first weak learner to train on feature 506 and feature 515 for a first entry and a third entry, a second weak learner to train on feature 509 and feature 512 for the first entry and the third entry, a third weak learner to train on feature 506 and feature 515 for a second, fourth, and fifth entry, and so on. In some embodiments, other methods of partitioning the entries may be used.

Returning to FIG. 1, communication subsystem 112 may receive, from the client devices, trained weak learners. For example, once each client device receives the untrained weak learners, the weak learners may train on the subset of client data on that client device to which that weak learner is assigned. When communication subsystem 112 receives the weak learners from the client devices, each trained weak learner may be trained to generate predictions based on a respective subset of the respective client data of the respective client device. For example, if model training subsystem 114 partitioned the client data according to features, each trained weak learner may be trained to generate predictions based on a respective subset of the features of the respective client data. In some embodiments, if model training subsystem 114 partitioned the client data according to entries, each trained weak learner may be trained to generate predictions based on a respective subset of the entries of the respective client data. In some embodiments, if model training subsystem 114 partitioned the client data according to data type, each trained weak learner may be trained to generate predictions based on a respective subset of the features of the respective client data based on the type of each feature.

Communication subsystem 112 may retrieve a synthetic dataset that is unlabeled. For example, the synthetic data may reflect client data of the client devices, but the synthetic data may not contain client data. For example, the synthetic dataset may have features that reflect the features of the aggregate client data. The synthetic data may reflect patterns, relationships, or other characteristics of the aggregate client data. The synthetic dataset may be unlabeled. For example, the synthetic dataset may not include labels or a target feature.

Model training subsystem 114 may input, into each trained weak learner, a subset of the synthetic dataset. For example, model training subsystem 114 may input, into a weak learner trained on two features (e.g., transaction dates and transaction types) of client data, a subset of the synthetic dataset including the two corresponding features (e.g., transaction dates and transaction types). Model training subsystem 114 may thus input a respective subset of the synthetic dataset according to the respective subset of the client data (e.g., features, entries, data types, etc.) on which the trained weak learner is trained. In some embodiments, model training subsystem 114 may input the synthetic dataset into an ensemble model. For example, an ensemble model may include the trained weak learners received from the client devices. The ensemble model may be a composite machine learning approach that combines predictions from multiple weak learners. By aggregating the predictions of multiple weak learners, the ensemble may achieve superior performance compared to any of the individual weak learners included within the ensemble model.

In some embodiments, inputting the synthetic data into the ensemble model (or trained weak learners) may cause each trained weak learner to generate a set of predictions for the synthetic dataset based on the respective subset of features. For example, based on the subset of the synthetic dataset input into a particular weak learner, the weak learner may predict a label or target feature for the synthetic data. For example, if a weak learner is trained on two features (e.g., transaction dates and transaction types) of the client data and receives, as input, two corresponding features (e.g., transaction dates and transaction types) of the synthetic dataset, the weak learner may generate a set of predictions for a label or target feature for the synthetic data. As an illustrative example, a target feature may be "Will the user make another transaction within the next seven days?" The weak learner may generate a set of predictions (e.g., "Yes" or "No") based on the subset of the synthetic dataset input into the weak learner. In some embodiments, a target feature may be "Will the user make another transaction within the next thirty days?" The weak learner may generate a set of predictions (e.g., "Yes" or "No") based on the subset of the synthetic dataset input into the weak learner. In some embodiments, a target feature may be "Location of next transaction." The weak learner may generate a set of predictions (e.g., predicted locations) based on the subset of the synthetic dataset input into the weak learner. In some embodiments, the weak learners may generate other predictions.

In some embodiments, model training subsystem 114 may aggregate the set of predictions generated by each trained weak learner to generate labels for the synthetic dataset. In some embodiments, the ensemble model may aggregate the set of predictions generated by each trained weak learner to generate labels for the synthetic dataset. For example, multiple weak learners may attempt to predict each label or each value for a target feature missing from the synthetic dataset. Each weak learner may rely on a different subset of the synthetic dataset (e.g., a subset of features, entries, etc.) to generate the prediction. The ensemble model may aggregate the various predictions for the same label or target feature and generate a label or target feature for the synthetic dataset.

A set of predictions may be aggregated to generate a label using various methods. In some embodiments, model training subsystem 114 may use a majority method in which the final label is based on a predicted label generated by the greatest number of weak learners or by a majority of the weak learners. In some embodiments, model training subsystem 114 may average the predicted labels generated by the weak learners to generate the label for the synthetic dataset. In some embodiments, model training subsystem 114 may generate a weighted average of the predicted labels generated by the weak learners to generate the label for the synthetic dataset. For example, weak learners that perform better than other weak learners may be assigned higher weights. In some embodiments, model training subsystem 114 may aggregate the set of predictions by assessing the predictions substantively. For example, a first weak learner may be trained to predict whether a client will perform the next transaction within seven days and a second weak learner may be trained to predict whether the client will perform the next transaction within thirty days. The first weak learner may predict "No" while the second weak learner may predict "Yes." Model training subsystem 114 may aggregate the predictions to predict a target feature (e.g., "When will the user make the next transaction?") between eight and thirty days. In some embodiments, other methods of aggregating the predictions may be used. In some embodiments, a combination of aggregation methods may be used.

In some embodiments, model training subsystem 114 may input, into a new model, the synthetic dataset and the labels. For example, model training subsystem 114 may use the synthetic dataset, labeled using the ensemble model, to train the new model to predict the labels for the synthetic dataset. The new model may be separate from the ensemble model and separate from the weak learners. In some embodiments, the new model may be a strong learner, as discussed above in relation to FIG. 2. The new model may have no exposure to client data and may be trained instead using the synthetic dataset. Thus, the client data may be protected when the new model is subsequently transmitted to the client devices, as the new model has not been trained on any client data. If a malicious actor were to intercept the new model during transmission, no client data would be exposed or compromised.

Communication subsystem 112 may transmit the new model to the client devices to cause each copy of the new model to deploy on a client device. Deploying the copies may involve installing and integrating each copy of the new model directly onto a client device (e.g., client devices 108a-108n). This deployment enables the new model to generate predictions locally on the client device. In some embodiments, the copy of the new model may, for a particular client device, generate predictions based on new data generated on the client device. In some embodiments, the copy of the new model may, for a particular client device, generate predictions based on data entered by a user of the client device. As an illustrative example, a user of a client device may use the new model to obtain a prediction of whether the user's application to a program is likely to be approved. The user may input data into the new model and the new model may generate a prediction. The accuracy of the new model may benefit from the client data of all client devices 108a-108n, but the client data may not be exposed to the user of the client device, as the new model was not trained on the client data directly.

In some embodiments, communication subsystem 112 may transmit, to each client device with the copy of the new model, a command to perform testing of the copy using the respective client data of the respective client device and to return results of the testing. For example, the client device or a user of the client device may assess predictions generated by the new model. Predictions generated by the new model based on the client data may be compared with actual client data. For example, client data may be input into the new model to obtain a prediction of whether a user's application to a program is likely to be approved. The prediction may be compared with actual data indicating whether the user's application was approved for the program. In some embodiments, model execution subsystem 116 may determine an accuracy of the copy of the model based on the actual client data on the client device. The accuracy may be a percentage of predictions that are correct, based on the actual client data, or some other measure of accuracy.

Communication subsystem 112 may receive results of such testing from each client device. For example, communication subsystem 112 may receive, from a first client device, first results indicating that a first accuracy associated with a first copy of the new model deployed on the first client device does not satisfy an accuracy threshold. In response to receiving the first results indicating that the first accuracy is insufficient, data protection system 102 (e.g., model execution subsystem 116) may apply or adjust weights associated with the predictions generated by the first client device. For example, model execution subsystem 116 may apply first weights to a first set of predictions generated by a first weak learner associated with the first client device. Model execution subsystem 116 may apply second weights to other sets of predictions generated by other weak learners. In some embodiments, the first weights may be higher than the second weights. This may cause the ensemble model to weigh predictions generated by the first weak learner more heavily when aggregating predictions to label the synthetic dataset. This may cause predictions by the new model to more accurately reflect the actual client data of the first client device. The ensemble model may then aggregate the set of predictions generated by each weak learner according to the first weights and the second weights to generate updated labels for the unlabeled synthetic dataset. Model training subsystem 114 may retrain the new model using the updated synthetic dataset labels. For example, model training subsystem 114 may input, into the new model, the unlabeled synthetic dataset and the updated labels to update the new model. The updated new model may be trained to predict the updated labels for the synthetic dataset. Communication subsystem 112 may then transmit an updated copy of the new model to the first client device to cause the updated copy of the new model to deploy on the first client device.

In some embodiments, the first weights may be lower than the second weights. This may cause the ensemble model to weigh predictions generated by the first weak learner less heavily (e.g., to disregard predictions generated by the first weak learner) when aggregating predictions to label the synthetic dataset. For example, the ensemble model may disregard predictions generated by the first weak learner if the client data of the first client device is determined to be an outlier or anomaly as compared with the aggregate client data. The ensemble model may then aggregate the set of predictions generated by each weak learner according to the first weights and the second weights to generate updated labels for the unlabeled synthetic dataset. Model training subsystem 114 may then retrain the new model using the updated synthetic dataset labels. Communication subsystem 112 may then transmit an updated copy of the new model to the first client device to cause the updated copy of the new model to deploy on the first client device.

In some embodiments, in response to receiving the first results indicating that the first accuracy does not satisfy the accuracy threshold, model training subsystem 114 may determine that certain features are missing from the synthetic dataset. For example, model training subsystem 114 may determine that first client data from the first client device includes one or more features that are not included in the unlabeled synthetic dataset. Model training subsystem 114 may generate an updated unlabeled synthetic dataset including the one or more features from the first client data. Model training subsystem 114 may then input, into the ensemble model, the updated unlabeled synthetic dataset to cause each weak learner to generate an updated set of predictions for the updated unlabeled synthetic dataset based on an updated respective subset of the updated unlabeled synthetic dataset. The ensemble model may aggregate the updated set of predictions generated by each weak learner to generate updated labels for the updated unlabeled synthetic dataset. Model training subsystem 114 may input, into the new model, the updated unlabeled synthetic dataset and the updated labels to train the new model to predict the updated labels for the updated unlabeled synthetic dataset. Communication subsystem 112 may then transmit an updated copy of the new model to the first client device to cause the updated copy of the new model to deploy on the first client device.

Figure 6:
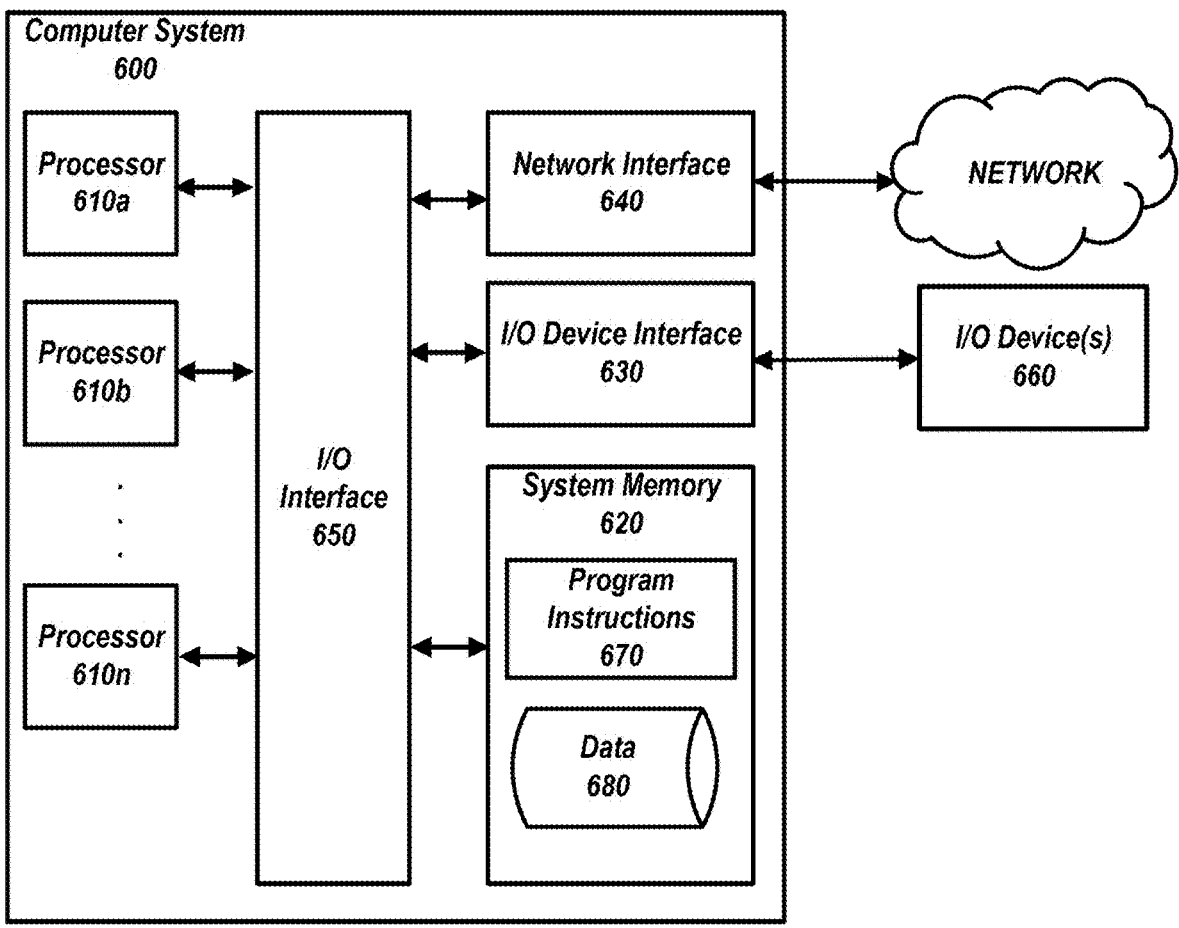
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a GPS, or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

FIG. 7 shows a flowchart of the process for protecting client data while training machine learning models, in accordance with one or more embodiments. For example, the system may use process 700 (e.g., as implemented on one or more system components described above) to protect client data from malicious actors while machine learning models trained on client data are being transmitted.

At 702, data protection system 102 (e.g., using one or more of processors 610a-610n) may transmit untrained simple models to client devices. In some embodiments, the untrained simple models may be weak learners. In some embodiments, data protection system 102 may transmit multiple untrained simple models to each client device. In some embodiments, data protection system 102 (e.g., communication subsystem 112) may transmit the untrained simple models to I/O devices 660 via the network. For example, the untrained simple models may be untrained weak learners. In some embodiments, multiple untrained weak learners may be sent to each client device. Each weak learner may be generated to be trained on a respective client device using a subset of respective client data on the respective client device. For example, the multiple weak learners transmitted to a particular client device may train on different subsets of the client data on that client device such that no single model trains on the entire set of client data for that client device.

At 704, data protection system 102 (e.g., using one or more of processors 610a-610n) may receive trained simple models from the client devices. For example, at each client device, each simple model may be trained to generate predictions based on a respective subset of the respective client data of the client device. In some embodiments, the subset may be a subset of features, entries, or other aspects of the client data. In some embodiments, data protection system 102 (e.g., communication subsystem 112) may receive the trained simple models from I/O devices 660 via the network. For example, once each client device receives the untrained weak learners, the weak learners may be trained on the subset of client data on that client device to which that weak learner is assigned. Each trained weak learner may be trained to generate predictions based on a respective subset of the respective client data of the respective client device. For example, if the client data is partitioned according to features, each trained weak learner may be trained to generate predictions based on a respective subset of the features of the respective client data. In some embodiments, if the client data is partitioned according to entries, each trained weak learner may be trained to generate predictions based on a respective subset of the entries of the respective client data. In some embodiments, if the client data is partitioned according to data type, each trained weak learner may be trained to generate predictions based on a respective subset of the features of the respective client data based on the type of each feature.

At 706, data protection system 102 (e.g., using one or more of processors 610a-610n) may input, into an ensemble model, an unlabeled synthetic dataset. In some embodiments, the ensemble model may include the trained simple models. In some embodiments, inputting the unlabeled synthetic dataset into the ensemble model may involve inputting, into each trained simple model, a respective subset of the synthetic dataset according to the respective subset of the client data on which the simple model is trained. This may cause each simple model included in the ensemble model to generate a set of predictions for the unlabeled synthetic dataset. For example, each simple model may predict a set of labels or a set of values for a target feature. In some embodiments, data protection system 102 (e.g., model training subsystem 114) may input the unlabeled synthetic dataset into the ensemble model using one or more of processors 610a-610n.

At 708, data protection system 102 (e.g., using one or more of processors 610a-610n) may cause the ensemble model to aggregate the set of predictions generated by each simple model to generate labels for the unlabeled synthetic dataset. For example, for each missing label or each missing value of a target feature in the unlabeled synthetic dataset, multiple simple models may generate a predicted label or value based on the subset of the dataset for which they are trained. Data protection system 102 may then aggregate the multiple predicted values to generate the labels for the synthetic dataset. In some embodiments, data protection system 102 (e.g., model training subsystem 114) may cause the ensemble model to aggregate the set of predictions using one or more of processors 610a-610n.

At 710, data protection system 102 (e.g., using one or more of processors 610a-610n) may input, into a new model, the unlabeled synthetic dataset and the labels. The new model may be different from the ensemble model and the simple models. In some embodiments, the new model may be a strong learner. In some embodiments, inputting the unlabeled synthetic dataset and the labels into the new model may train the new model to predict the labels for the unlabeled synthetic dataset. In some embodiments, data protection system 102 (e.g., model training subsystem 114) may input the unlabeled synthetic dataset and the labels into the new model using one or more of processors 610a-610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising transmitting, to each client device of a plurality of client devices, a set of untrained simple models, wherein each untrained simple model has been generated to be trained on a respective client device using a subset of a plurality of features of respective client data on the respective client device, receiving, from the plurality of client devices, a plurality of trained simple models, wherein each trained simple model is trained to generate predictions based on a respective subset of the plurality of features of the respective client data of the respective client device, retrieving a synthetic dataset that is unlabeled, the synthetic dataset generated based on the plurality of features of aggregate client data of the plurality of client devices, inputting, into each trained simple model of the plurality of trained simple models, a respective subset of the synthetic dataset according to the respective subset of the plurality of features on which the trained simple model is trained to cause each trained simple model to generate a set of predictions for the synthetic dataset based on the respective subset of the plurality of features, aggregating the set of predictions generated by each trained simple model of the plurality of trained simple models to generate a plurality of labels for the synthetic dataset; inputting, into a new model, the synthetic dataset and the plurality of labels to train the new model to predict the plurality of labels for the synthetic dataset, and transmitting a plurality of copies of the new model to the plurality of client devices to cause each copy of the new model to deploy on a client device of the plurality of client devices.

2. A method, the method comprising transmitting, to a plurality of client devices, a plurality of simple models, wherein each simple model is generated to be trained on a respective client device to generate predictions based on a respective subset of respective client data of the respective client device, receiving, from the plurality of client devices, the plurality of simple models, inputting, into an ensemble model comprising the plurality of simple models, an unlabeled synthetic dataset to cause each simple model to generate a set of predictions for the unlabeled synthetic dataset based on a respective subset of the unlabeled synthetic dataset, wherein the respective subset of the unlabeled synthetic dataset corresponds to the respective subset of the respective client data on which the simple model is trained, causing the ensemble model to aggregate the set of predictions generated by each simple model to generate a plurality of labels for the unlabeled synthetic dataset, and inputting, into a new model, the unlabeled synthetic dataset and the plurality of labels to train the new model to predict the plurality of labels for the unlabeled synthetic dataset.

3. A method, the method comprising transmitting, to a plurality of client devices, a plurality of simple models, wherein each simple model is generated to be trained on a respective client device to generate predictions based on a respective subset of respective client data of the respective client device, receiving, from the plurality of client devices, the plurality of simple models, inputting, into an ensemble model comprising the plurality of simple models, an unlabeled synthetic dataset to cause the ensemble model to aggregate a set of predictions generated by each simple model to generate a plurality of labels for the unlabeled synthetic dataset, and inputting, into a new model, the unlabeled synthetic dataset and the plurality of labels to train the new model to predict the plurality of labels for the unlabeled synthetic dataset.

4. The method of any one of the preceding embodiments, further comprising transmitting a copy of the new model to each client device of the plurality of client devices with a request to cause the copy of the new model to deploy on the respective client device.

5. The method of any one of the preceding embodiments, wherein transmitting the copy of the new model to each client device comprises transmitting, to each client device, a command to perform testing of the copy using the respective client data of the respective client device and to return results of the testing.

6. The method of any one of the preceding embodiments, further comprising receiving, from a first client device of the plurality of client devices, first results indicating that a first accuracy associated with a first copy of the new model deployed on the first client device does not satisfy an accuracy threshold.

7. The method of any one of the preceding embodiments, further comprising, in response to receiving the first results indicating that the first accuracy does not satisfy the accuracy threshold applying first weights to a first set of predictions generated by a first simple model associated with the first client device and applying second weights to other sets of predictions generated by other simple models of the plurality of simple models, wherein the first weights are higher than the second weights, aggregating the set of predictions generated by each simple model according to the first weights and the second weights to generate an updated plurality of labels for the unlabeled synthetic dataset, inputting, into the new model, the unlabeled synthetic dataset and the updated plurality of labels to update the new model to predict the updated plurality of labels for the unlabeled synthetic dataset, and transmitting an updated copy of the new model to the first client device to cause the updated copy of the new model to deploy on the first client device.

8. The method of any one of the preceding embodiments, further comprising, in response to receiving the first results indicating that the first accuracy does not satisfy the accuracy threshold applying first weights to a first set of predictions generated by a first simple model associated with the first client device and applying second weights to other sets of predictions generated by other simple models of the plurality of simple models, wherein the first weights are lower than the second weights, aggregating the set of predictions generated by each simple model according to the first weights and the second weights to generate an updated plurality of labels for the unlabeled synthetic dataset, inputting, into the new model, the unlabeled synthetic dataset and the updated plurality of labels to update the new model to predict the updated plurality of labels for the unlabeled synthetic dataset, and transmitting an updated copy of the new model to the first client device to cause the updated copy of the new model to deploy on the first client device.

9. The method of any one of the preceding embodiments, further comprising, in response to receiving the first results indicating that the first accuracy does not satisfy the accuracy threshold determining that first client data from the first client device comprises one or more features that are not included in the unlabeled synthetic dataset, generating an updated unlabeled synthetic dataset comprising the one or more features from the first client data, inputting, into the ensemble model, the updated unlabeled synthetic dataset to cause each simple model to generate an updated set of predictions for the updated unlabeled synthetic dataset based on an updated respective subset of the updated unlabeled synthetic dataset, aggregating the updated set of predictions generated by each simple model to generate an updated plurality of labels for the updated unlabeled synthetic dataset, inputting, into the new model, the updated unlabeled synthetic dataset and the updated plurality of labels to train the new model to predict the updated plurality of labels for the updated unlabeled synthetic dataset, and transmitting an updated copy of the new model to the first client device to cause the updated copy of the new model to deploy on the first client device.

10. The method of any one of the preceding embodiments, further comprising receiving, from the plurality of client devices, feature data indicating a plurality of features of aggregate client data of the plurality of client devices, determining, based on the feature data, one or more relationships between the plurality of features, separating the plurality of features into a first subset of features and a second subset of features based on the one or more relationships between the plurality of features such that related features are separated between the first subset of features and the second subset of features, and assigning, for each client device, the first subset of features to a first simple model and the second subset of features to a second simple model such that the first simple model is trained to generate a first set of predictions based on the first subset of features and the second simple model is trained to generate a second set of predictions based on the second subset of features.

11. The method of any one of the preceding embodiments, further comprising receiving, from the plurality of client devices, entry data indicating a plurality of entries of aggregate client data from the plurality of client devices, determining, based on the entry data, one or more relationships between the plurality of entries, separating the plurality of entries into a first subset of entries and a second subset of entries based on the one or more relationships between the plurality of entries such that related entries are separated between the first subset of entries and the second subset of entries, and assigning, for each client device, the first subset of entries to a first simple model and the second subset of entries to a second simple model such that the first simple model is trained to generate a first set of predictions based on the first subset of entries and the second simple model is trained to generate a second set of predictions based on the second subset of entries.

12. The method of any one of the preceding embodiments, further comprising receiving, from the plurality of client devices, indications of a first type of data and a second type of data of aggregate client data of the plurality of client devices, separating a plurality of features of the client data into a first subset of features having the first type of data and a second subset of features having the second type of data, and assigning, for each client device, the first subset of features to a first simple model and the second subset of features to a second simple model such that the first simple model is trained to generate a first set of predictions based on the first subset of features and the second simple model is trained to generate a second set of predictions based on the second subset of features.

13. The method of any one of the preceding embodiments, further comprising transmitting, to each client device of the plurality of client devices, a set of simple models of the plurality of simple models to cause each simple model to train to generate the predictions based on the respective subset of respective client data of the respective client device.

14. A tangible, non-transitory, machine-readable medium storing instructions that, when executed by a data processing apparatus, cause the data processing apparatus to perform operations comprising those of any of embodiments 1-13.

15. A system comprising one or more processors and memory storing instructions that, when executed by the processors, cause the processors to effectuate operations comprising those of any of embodiments 1-13.

16. A system comprising means for performing any of embodiments 1-13.

17. A system comprising cloud-based circuitry for performing any of embodiments 1-13.

What is claimed is:

1. A system for protecting client data from malicious actors while training machine learning models on aspects of the client data, the system comprising:
one or more processors; and
one or more non-transitory, computer-readable media having computer-executable instructions stored thereon that, when executed by the one or more processors, cause the system to perform operations comprising:
transmitting, to each client device of a plurality of client devices, a set of untrained simple models, wherein each untrained simple model has been generated to be trained on a respective client device using a subset of a plurality of features of respective client data on the respective client device;
receiving, from the plurality of client devices, a plurality of trained simple models, wherein each trained simple model is trained to generate predictions based on a respective subset of the plurality of features of the respective client data of the respective client device;
retrieving a synthetic dataset that is unlabeled, the synthetic dataset generated based on the plurality of features of aggregate client data of the plurality of client devices;
inputting, into each trained simple model of the plurality of trained simple models, a respective subset of the synthetic dataset according to the respective subset of the plurality of features on which the trained simple model is trained to cause each trained simple model to generate a set of predictions for the synthetic dataset based on the respective subset of the plurality of features;
aggregating the set of predictions generated by each trained simple model of the plurality of trained simple models to generate a plurality of labels for the synthetic dataset;
inputting, into a new model, the synthetic dataset and the plurality of labels to train the new model to predict the plurality of labels for the synthetic dataset; and
transmitting a plurality of copies of the new model to the plurality of client devices to cause each copy of the new model to deploy on a client device of the plurality of client devices.

2. A method for protecting client data from malicious actors while training machine learning models, the method comprising:
transmitting, to a plurality of client devices, a plurality of simple models, wherein each simple model is generated to be trained on a respective client device to generate predictions based on a respective subset of respective client data of the respective client device;
receiving, from the plurality of client devices, the plurality of simple models;
inputting, into an ensemble model comprising the plurality of simple models, an unlabeled synthetic dataset to cause each simple model to generate a set of predictions for the unlabeled synthetic dataset based on a respective subset of the unlabeled synthetic dataset, wherein the respective subset of the unlabeled synthetic dataset corresponds to the respective subset of the respective client data on which the simple model is trained;
causing the ensemble model to aggregate the set of predictions generated by each simple model to generate a plurality of labels for the unlabeled synthetic dataset; and
inputting, into a new model, the unlabeled synthetic dataset and the plurality of labels to train the new model to predict the plurality of labels for the unlabeled synthetic dataset.

3. The method of claim 2, further comprising transmitting a copy of the new model to each client device of the plurality of client devices with a request to cause the copy of the new model to deploy on the respective client device.

4. The method of claim 3, wherein transmitting the copy of the new model to each client device comprises transmitting, to each client device, a command to perform testing of the copy using the respective client data of the respective client device and to return results of the testing.

5. The method of claim 4, further comprising receiving, from a first client device of the plurality of client devices, first results indicating that a first accuracy associated with a first copy of the new model deployed on the first client device does not satisfy an accuracy threshold.

6. The method of claim 5, further comprising, in response to receiving the first results indicating that the first accuracy does not satisfy the accuracy threshold:

applying first weights to a first set of predictions generated by a first simple model associated with the first client device and applying second weights to other sets of predictions generated by other simple models of the plurality of simple models, wherein the first weights are higher than the second weights;

aggregating the set of predictions generated by each simple model according to the first weights and the second weights to generate an updated plurality of labels for the unlabeled synthetic dataset;

inputting, into the new model, the unlabeled synthetic dataset and the updated plurality of labels to update the new model to predict the updated plurality of labels for the unlabeled synthetic dataset; and transmitting an updated copy of the new model to the first client device to cause the updated copy of the new model to deploy on the first client device.

7. The method of claim 5, further comprising, in response to receiving the first results indicating that the first accuracy does not satisfy the accuracy threshold:

applying first weights to a first set of predictions generated by a first simple model associated with the first client device and applying second weights to other sets of predictions generated by other simple models of the plurality of simple models, wherein the first weights are lower than the second weights;

aggregating the set of predictions generated by each simple model according to the first weights and the second weights to generate an updated plurality of labels for the unlabeled synthetic dataset;

inputting, into the new model, the unlabeled synthetic dataset and the updated plurality of labels to update the new model to predict the updated plurality of labels for the unlabeled synthetic dataset; and transmitting an updated copy of the new model to the first client device to cause the updated copy of the new model to deploy on the first client device.

8. The method of claim 5, further comprising, in response to receiving the first results indicating that the first accuracy does not satisfy the accuracy threshold:

determining that first client data from the first client device comprises one or more features that are not included in the unlabeled synthetic dataset;

generating an updated unlabeled synthetic dataset comprising the one or more features from the first client data;

inputting, into the ensemble model, the updated unlabeled synthetic dataset to cause each simple model to generate an updated set of predictions for the updated unlabeled synthetic dataset based on an updated respective subset of the updated unlabeled synthetic dataset;

aggregating the updated set of predictions generated by each simple model to generate an updated plurality of labels for the updated unlabeled synthetic dataset;

inputting, into the new model, the updated unlabeled synthetic dataset and the updated plurality of labels to train the new model to predict the updated plurality of labels for the updated unlabeled synthetic dataset; and transmitting an updated copy of the new model to the first client device to cause the updated copy of the new model to deploy on the first client device.

9. The method of claim 2, further comprising:

receiving, from the plurality of client devices, feature data indicating a plurality of features of aggregate client data of the plurality of client devices;

determining, based on the feature data, one or more relationships between the plurality of features;

separating the plurality of features into a first subset of features and a second subset of features based on the one or more relationships between the plurality of features such that related features are separated between the first subset of features and the second subset of features; and assigning, for each client device, the first subset of features to a first simple model and the second subset of features to a second simple model such that the first simple model is trained to generate a first set of predictions based on the first subset of features and the second simple model is trained to generate a second set of predictions based on the second subset of features.

10. The method of claim 2, further comprising:

receiving, from the plurality of client devices, entry data indicating a plurality of entries of aggregate client data from the plurality of client devices;

determining, based on the entry data, one or more relationships between the plurality of entries;

separating the plurality of entries into a first subset of entries and a second subset of entries based on the one or more relationships between the plurality of entries such that related entries are separated between the first subset of entries and the second subset of entries; and assigning, for each client device, the first subset of entries to a first simple model and the second subset of entries to a second simple model such that the first simple model is trained to generate a first set of predictions based on the first subset of entries and the second simple model is trained to generate a second set of predictions based on the second subset of entries.

11. The method of claim 2, further comprising:

receiving, from the plurality of client devices, indications of a first type of data and a second type of data of aggregate client data of the plurality of client devices;

separating a plurality of features of the client data into a first subset of features having the first type of data and a second subset of features having the second type of data; and assigning, for each client device, the first subset of features to a first simple model and the second subset of features to a second simple model such that the first simple model is trained to generate a first set of predictions based on the first subset of features and the second simple model is trained to generate a second set of predictions based on the second subset of features.

12. The method of claim 2, further comprising transmitting, to each client device of the plurality of client devices, a set of simple models of the plurality of simple models to cause each simple model to train to generate the predictions based on the respective subset of respective client data of the respective client device.

13. One or more non-transitory, computer-readable media storing instructions that, when executed by one or more processors, cause operations comprising:

transmitting, to a plurality of client devices, a plurality of simple models, wherein each simple model is generated to be trained on a respective client device to generate predictions based on a respective subset of respective client data of the respective client device;

receiving, from the plurality of client devices, the plurality of simple models;

inputting, into an ensemble model comprising the plurality of simple models, an unlabeled synthetic dataset to cause the ensemble model to aggregate a set of predictions generated by each simple model to generate a plurality of labels for the unlabeled synthetic dataset; and inputting, into a new model, the unlabeled synthetic dataset and the plurality of labels to train the new model to predict the plurality of labels for the unlabeled synthetic dataset.

14. The one or more non-transitory, computer-readable media of claim 13, wherein inputting the unlabeled synthetic dataset into the ensemble model comprises causing each simple model to generate the set of predictions for the unlabeled synthetic dataset based on a respective subset of the unlabeled synthetic dataset, wherein the respective subset of the unlabeled synthetic dataset corresponds to the respective subset of the respective client data on which the simple model is trained.

15. The one or more non-transitory, computer-readable media of claim 13, wherein the instructions further cause the one or more processors to perform operations comprising transmitting a copy of the new model to each client device of the plurality of client devices with a request to cause the copy of the new model to deploy on the respective client device.

16. The one or more non-transitory, computer-readable media of claim 15, wherein transmitting the copy of the new model to each client device comprises transmitting, to each client device, a command to perform testing of the copy using the respective client data of the respective client device and to return results of the testing.

17. The one or more non-transitory, computer-readable media of claim 16, wherein the instructions further cause the one or more processors to perform operations comprising receiving, from a first client device of the plurality of client devices, first results indicating that a first accuracy associated with a first copy of the new model deployed on the first client device does not satisfy an accuracy threshold.

18. The one or more non-transitory, computer-readable media of claim 17, wherein the instructions further cause the one or more processors to perform operations comprising, in response to receiving the first results indicating that the first accuracy does not satisfy the accuracy threshold:

applying first weights to a first set of predictions generated by a first simple model associated with the first client device and applying second weights to other sets of predictions generated by other simple models of the plurality of simple models, wherein the first weights are higher than the second weights;

aggregating the set of predictions generated by each simple model according to the first weights and the second weights to generate an updated plurality of labels for the unlabeled synthetic dataset;

inputting, into the new model, the unlabeled synthetic dataset and the updated plurality of labels to update the new model to predict the updated plurality of labels for the unlabeled synthetic dataset; and transmitting an updated copy of the new model to the first client device to cause the updated copy of the new model to deploy on the first client device.

19. The one or more non-transitory, computer-readable media of claim 17, wherein the instructions further cause the one or more processors to perform operations comprising, in response to receiving the first results indicating that the first accuracy does not satisfy the accuracy threshold:

applying first weights to a first set of predictions generated by a first simple model associated with the first client device and applying second weights to other sets of predictions generated by other simple models of the plurality of simple models, wherein the first weights are lower than the second weights;

aggregating the set of predictions generated by each simple model according to the first weights and the second weights to generate an updated plurality of labels for the unlabeled synthetic dataset;

inputting, into the new model, the unlabeled synthetic dataset and the updated plurality of labels to update the new model to predict the updated plurality of labels for the unlabeled synthetic dataset; and transmitting an updated copy of the new model to the first client device to cause the updated copy of the new model to deploy on the first client device.

20. The one or more non-transitory, computer-readable media of claim 17, wherein the instructions further cause the one or more processors to perform operations comprising, in response to receiving the first results indicating that the first accuracy does not satisfy the accuracy threshold:

determining that first client data from the first client device comprises one or more features that are not included in the unlabeled synthetic dataset;

generating an updated unlabeled synthetic dataset comprising the one or more features from the first client data;

inputting, into the ensemble model, the updated unlabeled synthetic dataset to cause each simple model to generate an updated set of predictions for the updated unlabeled synthetic dataset based on an updated respective subset of the updated unlabeled synthetic dataset;

aggregating the updated set of predictions generated by each simple model to generate an updated plurality of labels for the updated unlabeled synthetic dataset;

inputting, into the new model, the updated unlabeled synthetic dataset and the updated plurality of labels to train the new model to predict the updated plurality of labels for the updated unlabeled synthetic dataset; and transmitting an updated copy of the new model to the first client device to cause the updated copy of the new model to deploy on the first client device.

* * * * *